US010643006B2

(12) United States Patent
Cheng et al.

(10) Patent No.: US 10,643,006 B2
(45) Date of Patent: May 5, 2020

(54) SEMICONDUCTOR CHIP INCLUDING INTEGRATED SECURITY CIRCUIT

(71) Applicant: International Business Machines Corporation, Armonk, NY (US)

(72) Inventors: Kangguo Cheng, Schenectady, NY (US); Oleg Gluschenkov, Tannersville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 121 days.

(21) Appl. No.: 15/622,829

(22) Filed: Jun. 14, 2017

(65) Prior Publication Data

US 2018/0365450 A1 Dec. 20, 2018

(51) Int. Cl.
| G06F 21/00 | (2013.01) |
| G06F 21/76 | (2013.01) |
| H01L 23/00 | (2006.01) |
| G06F 21/73 | (2013.01) |
| G06F 21/44 | (2013.01) |

(52) U.S. Cl.
CPC ............. *G06F 21/76* (2013.01); *G06F 21/44* (2013.01); *G06F 21/73* (2013.01); *H01L 23/576* (2013.01); *G06F 2212/1052* (2013.01)

(58) Field of Classification Search
CPC .. G06F 21/76; G06F 2212/1052; G06F 21/73; G06F 21/44; H04L 23/576; H01L 23/576
See application file for complete search history.

(56) References Cited

U.S. PATENT DOCUMENTS

| 4,852,016 | A | * | 7/1989 | McGehee | ........... G06F 17/5077 716/123 |
| 5,469,557 | A | * | 11/1995 | Salt | .......................... G11C 8/20 711/103 |
| 5,559,889 | A | * | 9/1996 | Easter | ..................... G06F 21/72 380/30 |
| 5,970,346 | A | * | 10/1999 | Liaw | ..................... H01L 21/768 148/DIG. 55 |
| 6,836,847 | B1 | * | 12/2004 | Zinger | .................... G06F 21/86 713/193 |

(Continued)

FOREIGN PATENT DOCUMENTS

WO    2012077856 A1    6/2012

OTHER PUBLICATIONS

Armknecht et al., "A Formal Foundation for the Security Features of Physical Functions," IEEE Symposium on Security and Privacy, 2011, pp. 1-17.

(Continued)

*Primary Examiner* — David Garcia Cervetti
(74) *Attorney, Agent, or Firm* — Cantor Colburn LLP; Vazken Alexanian (57) ABSTRACT

A device configured to authenticate an integrated circuit includes an integrated circuit on a substrate, and at least one security circuit segmented into at least two security parts. The two security parts are located at separate locations on the substrate with respect to one another. At least one of the security parts includes a memory element having a key code programmed therein that authenticates the integrated circuit.

18 Claims, 4 Drawing Sheets

(56) References Cited

U.S. PATENT DOCUMENTS

| | | | | |
|---|---|---|---|---|
| 6,996,547 | B1* | 2/2006 | Tugenberg | G06Q 20/085 355/52 |
| 7,019,364 | B1* | 3/2006 | Sato | B82Y 20/00 257/347 |
| 7,111,193 | B1* | 9/2006 | Hsieh | G11C 29/785 365/200 |
| 7,165,180 | B1* | 1/2007 | Ducharme | H04K 1/00 365/225.7 |
| 7,228,521 | B1* | 6/2007 | Ma | G11C 29/88 714/25 |
| 7,550,324 | B1* | 6/2009 | Walstrum, Jr. | H03K 19/17768 326/101 |
| 8,803,328 | B1 | 8/2014 | Song et al. | |
| 9,147,579 | B2* | 9/2015 | Hiruta | H01L 21/306 |
| 9,189,654 | B2 | 11/2015 | Feng et al. | |
| 9,281,236 | B2* | 3/2016 | Feng | H01L 23/535 |
| 9,530,838 | B2* | 12/2016 | Abiko | H01L 29/045 |
| 9,711,393 | B2* | 7/2017 | Kautzsch | H01L 21/3247 |
| 9,742,563 | B2* | 8/2017 | Gotze | H04L 9/0866 |
| 9,865,537 | B1* | 1/2018 | Male | H01L 23/5256 |
| 9,997,233 | B1* | 6/2018 | Ware | G11C 29/22 |
| 10,223,489 | B2* | 3/2019 | Barowski | G06F 17/5077 |
| 10,346,325 | B2* | 7/2019 | Sinclair | G06F 12/0246 |
| 10,366,237 | B2* | 7/2019 | Zimmer | H04L 9/14 |
| 10,382,410 | B2* | 8/2019 | Jayasena | G06F 12/1408 |
| 10,387,653 | B2* | 8/2019 | Huang | H04L 9/0822 |
| 10,389,536 | B2* | 8/2019 | Myers | H04N 1/32272 |
| 10,395,705 | B2* | 8/2019 | Rathfelder | G11C 8/20 |
| 10,402,565 | B2* | 9/2019 | Sarangdhar | G06F 21/572 |
| 2001/0015919 | A1* | 8/2001 | Kean | G06F 12/1408 365/200 |
| 2002/0190380 | A1* | 12/2002 | Saiki | H01L 23/522 257/752 |
| 2002/0199162 | A1* | 12/2002 | Ramaswamy | G06F 17/5068 716/52 |
| 2003/0196185 | A1* | 10/2003 | Bruce | G03F 7/70433 716/51 |
| 2004/0021227 | A1* | 2/2004 | Watanabe | H01L 23/522 257/773 |
| 2005/0071656 | A1* | 3/2005 | Klein | G06F 21/46 713/193 |
| 2005/0177741 | A1* | 8/2005 | Chen | H04L 9/0822 713/189 |
| 2006/0059368 | A1* | 3/2006 | Fayad | G06F 21/72 713/189 |
| 2006/0059369 | A1* | 3/2006 | Fayad | G06F 21/6218 713/189 |
| 2006/0059372 | A1* | 3/2006 | Fayar | G06F 21/72 713/192 |
| 2006/0059373 | A1* | 3/2006 | Fayad | G06F 21/72 713/192 |
| 2006/0059574 | A1* | 3/2006 | Fayad | G06F 21/76 726/34 |
| 2006/0061795 | A1* | 3/2006 | Walmsley | G06F 21/73 358/1.14 |
| 2006/0176068 | A1* | 8/2006 | Holtzman | G06F 21/77 324/750.3 |
| 2006/0177064 | A1* | 8/2006 | Holtzman | G06F 21/77 380/277 |
| 2006/0218425 | A1* | 9/2006 | Ding | G06F 21/6218 713/323 |
| 2006/0259743 | A1* | 11/2006 | Suzuoki | G06F 1/206 712/220 |
| 2006/0289658 | A1* | 12/2006 | Fischer | G06F 21/73 235/492 |
| 2007/0083491 | A1* | 4/2007 | Walmsley | G06F 21/608 |
| 2007/0296403 | A1* | 12/2007 | Mori | G06F 21/73 324/750.15 |
| 2008/0061817 | A1* | 3/2008 | Erickson | G06F 17/5054 326/8 |
| 2008/0111579 | A1* | 5/2008 | Diluoffo | G06F 21/86 326/8 |
| 2008/0111682 | A1* | 5/2008 | Diluoffo | G06F 21/86 340/540 |
| 2008/0149700 | A1* | 6/2008 | Tuyls | G11B 20/00086 235/375 |
| 2008/0159539 | A1* | 7/2008 | Huang | H04L 9/0866 380/277 |
| 2008/0282084 | A1* | 11/2008 | Hatakeyama | G06F 21/57 713/155 |
| 2008/0292129 | A1* | 11/2008 | Fan | G06F 17/2294 382/100 |
| 2009/0196418 | A1* | 8/2009 | Tkacik | G06F 21/72 380/46 |
| 2009/0224323 | A1* | 9/2009 | Im | G11C 17/16 257/355 |
| 2009/0267636 | A1* | 10/2009 | Choi | G11C 17/16 326/8 |
| 2009/0285390 | A1* | 11/2009 | Scherer | G06F 21/51 380/44 |
| 2009/0293130 | A1* | 11/2009 | Henry | G06F 21/74 726/26 |
| 2010/0027788 | A1* | 2/2010 | Tkacik | H04L 63/06 380/46 |
| 2010/0128320 | A1* | 5/2010 | Fan | H04N 1/32203 358/3.28 |
| 2010/0208885 | A1* | 8/2010 | Murphy | H04L 9/003 380/28 |
| 2010/0224956 | A1* | 9/2010 | Kim | H01L 23/5256 257/529 |
| 2010/0287374 | A1* | 11/2010 | Roy | G06F 21/70 713/171 |
| 2010/0290303 | A1* | 11/2010 | Wada | G11C 17/16 365/225.7 |
| 2010/0328113 | A1* | 12/2010 | Henry | G06F 21/86 341/24 |
| 2011/0002461 | A1 | 1/2011 | Erhart et al. | |
| 2011/0007482 | A1* | 1/2011 | Takada | H05K 1/147 361/749 |
| 2011/0018092 | A1* | 1/2011 | Oshima | H01L 23/5256 257/529 |
| 2011/0066787 | A1* | 3/2011 | Markey | G06F 21/572 711/103 |
| 2011/0072279 | A1* | 3/2011 | Milliken | G06F 21/71 713/194 |
| 2011/0084412 | A1* | 4/2011 | Brenna | H01L 23/544 257/797 |
| 2011/0176380 | A1* | 7/2011 | Bentley | G11C 16/22 365/225.7 |
| 2011/0215829 | A1 | 9/2011 | Guajardo Merchan et al. | |
| 2011/0291208 | A1* | 12/2011 | Takagi | B81B 7/02 257/417 |
| 2011/0298203 | A1* | 12/2011 | Pan | G06K 9/2063 283/67 |
| 2012/0042157 | A1* | 2/2012 | Leclercq | G06F 21/72 713/2 |
| 2012/0079287 | A1* | 3/2012 | Leclercq | G06F 21/575 713/192 |
| 2012/0140929 | A1* | 6/2012 | Clark | G06F 21/79 380/277 |
| 2012/0168506 | A1 | 7/2012 | Ruehrmair et al. | |
| 2012/0250429 | A1* | 10/2012 | Tailliet | G01R 31/31719 365/189.011 |
| 2013/0083586 | A1* | 4/2013 | Petitprez | H01L 23/544 365/102 |
| 2013/0200606 | A1* | 8/2013 | Omar | B41M 3/14 283/74 |
| 2013/0321066 | A1* | 12/2013 | Fifield | H01L 23/544 327/525 |
| 2014/0068246 | A1* | 3/2014 | Hartley | G09C 1/00 713/155 |
| 2014/0093074 | A1* | 4/2014 | Gotze | H04L 9/0866 380/45 |
| 2014/0185795 | A1* | 7/2014 | Gotze | G06F 21/44 380/44 |
| 2014/0201540 | A1* | 7/2014 | Li | H04L 9/0894 713/193 |

(56) References Cited

U.S. PATENT DOCUMENTS

| | | | |
|---|---|---|---|
| 2015/0084193 A1* | 3/2015 | Feng | H01L 23/535 257/741 |
| 2015/0100792 A1* | 4/2015 | Hartley | G06F 21/575 713/189 |
| 2015/0187709 A1* | 7/2015 | Lee | H01L 21/0217 257/529 |
| 2015/0188707 A1* | 7/2015 | Gehrer | H04L 9/14 380/30 |
| 2016/0006462 A1* | 1/2016 | Hanham | H03M 13/3715 714/764 |
| 2016/0028544 A1* | 1/2016 | Hyde | H04L 9/0869 380/44 |
| 2016/0079166 A1* | 3/2016 | Farooq | H01L 23/5256 257/529 |
| 2017/0169899 A1* | 6/2017 | Lal | G11C 19/00 |
| 2017/0208692 A1* | 7/2017 | Ahn | H05K 1/0206 |
| 2017/0249267 A1* | 8/2017 | Muraleedharan | G06F 13/24 |
| 2018/0025982 A1* | 1/2018 | Hall | G11C 17/18 257/529 |
| 2018/0061507 A1* | 3/2018 | Yan | G11C 17/16 |
| 2018/0091293 A1* | 3/2018 | Suresh | H04L 9/002 |
| 2018/0189493 A1* | 7/2018 | Schilder | G01R 31/31858 |
| 2018/0241568 A1* | 8/2018 | Schilder | H04L 9/3247 |

OTHER PUBLICATIONS

Krishna et al., "MECCA: a robust low-overhead PUF using embedded memory array," International Workshop on Cryptographic Hardware and Embedded Systems (2011), pp. 1-14.

Kumar et al., "The butterfly PUF protecting IP on every FPGA," (Extended Abstract): IEEE International Workshop on Hardware-Oriented Security and Trust, 2008. HOST 2008, pp. 1-4.

Maes et al., "Intrinsic PUFs from flip-flops on reconfigurable devices," 3rd Benelux workshop on information and system security (WISSec 2008), pp. 1-17.

* cited by examiner

SEMICONDUCTOR CHIP INCLUDING INTEGRATED SECURITY CIRCUIT

BACKGROUND

The present invention relates in general to semiconductor devices, and more particularly, to fabrication methods and resulting semiconductor devices that include integrated replication security measures.

Integrated circuit (IC) security is becoming increasingly important as more and more counterfeit ICs enter the market. The ability to inhibit unauthorized reproduction of a semiconductor device such as an IC formed on a semiconductor chip, for example, has been achieved in the past by employing a security circuit for authenticating the IC. The security circuit stores a key code that is unique to that IC, and is used to authenticate the IC during use. An IC without a valid key code is typically disabled or restricted from use, thereby preventing unauthorized replication.

SUMMARY

Embodiments are directed to a method for authenticating an integrated circuit. A non-limiting example of the method includes forming an integrated circuit on a substrate, and placing a plurality of individual security parts on the substrate to define at least one security circuit. Each security part is located at a different location on the substrate to separate the security circuit into segments. The method further includes programming at least one security part among the plurality of security parts with key code data to program the at least one security circuit with a key code.

Embodiments are also directed to a device configured to authenticate an integrated circuit. A non-limiting example of the device includes an integrated circuit on a substrate, and at least one security circuit segmented into at least two security parts. The two security parts are located at separate locations on the substrate with respect to one another. At least one of the security parts includes a memory element having a key code programmed therein that authenticates the integrated circuit.

Additional technical features and benefits are realized through the techniques of the present invention. Embodiments and aspects of the invention are described in detail herein and are considered a part of the claimed subject matter. For a better understanding, refer to the detailed description and to the drawing.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated

DETAILED DESCRIPTION

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The term "exemplary" is used herein to mean "serving as an example, instance, or illustration." Any embodiment or design described herein as "exemplary" is not necessarily to be construed as preferred or advantageous over other embodiments or designs. The term "one or more" is understood to include any integer number greater than or equal to one, i.e. one, two, three, four, etc. The term "a plurality" is understood to include any integer number greater than or equal to two, i.e. two, three, four, five, etc. Additionally, the term "wafer", also called a "slice" or "substrate" are recited in this detailed description to include a thin slice of semiconductor material such as a crystalline silicon, for example, which is used in electronics for the fabrication of integrated circuits. The wafer serves as the substrate for microelectronic and semiconductor devices built in, on, and over the wafer. The wafer can undergo many microfabrication process steps such as doping or ion implantation, etching, deposition of various materials, photolithographic patterning, and epitaxy processes.

References in the specification to "one embodiment," "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, where intervening elements such as an interface structure can be present between the first element and the second element. The term "direct contact" means that a first element (such as a first structure) and a second element (such as a second structure) are connected to one another without any intermediary layers at the interface of the two elements.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps or operations in the manufacture of semiconductor devices and semiconductor-based ICs are well known and so, in the interest of brevity, many conventional steps will only be mentioned briefly herein or will be omitted entirely without providing the well-known process details Turning now to an overview of technologies that are more specifically relevant to aspects of the present invention, one or more embodiments described herein aim to reduce the unauthorized reproduction of a semiconductor device (e.g., an IC) by hindering reverse engineering efforts intended to identify and read the security key code associated with the IC. One method for counterfeit ICs to appear legitimate is to use a valid key code that is illegitimately copied or "read" from an authorized IC using reverse engineering techniques. In this manner, a counterfeit IC with a valid key code would appear to be a legitimate and authorized IC to an end user. It is therefore important to deny access to key codes that are associated with an authorized IC.

As energy inspection devices become more readily available, there is a need to improve IC security to deter reverse engineering efforts without also increasing the cost to design and manufacture ICs. More specifically, there is a need to deny access to unauthorized users from viewing a semiconductor chip's security circuit and its memory elements, or viewing and/or reading the key code found in those memory elements to prevent unauthorized replication of the chip. For instance, electron beam (e-beam), or infrared inspection techniques can be used to view the state of the memory elements of the security circuit and read the key code of a valid IC. However, these reverse engineering techniques still require knowledge of the physical location of the security circuit on an IC to access the contents of the memory elements and extract the key code. Embodiments of the invention aim to counter conventional reverse engineering efforts by making it difficult to identify the physical location of the security circuit.

Turning now to an overview of aspects of the invention, one or more non-limiting embodiments address the above-described shortcoming of the prior art by providing fabrication methods and resulting semiconductor devices (e.g., an IC) that contain one or more security circuits that have been segmented into multiple pieces. The individual security segments are located in multiple white space areas on a substrate. A "white space" as referred to herein is an area of the substrate that is not occupied by functional elements of the IC and is free of any circuitry or logic. Locating the security segments of the security circuits in the white space areas of the substrate eliminates the functional area footprint of these circuits. In some embodiments, the IC can include dummy or decoy security circuits which are segmented and located in the multiple white space areas of the substrate along with a valid security circuit to further inhibit an unauthorized user from determining the key code by visual inspection, measurement, test, or other forms of reverse engineering.

Figure 1:
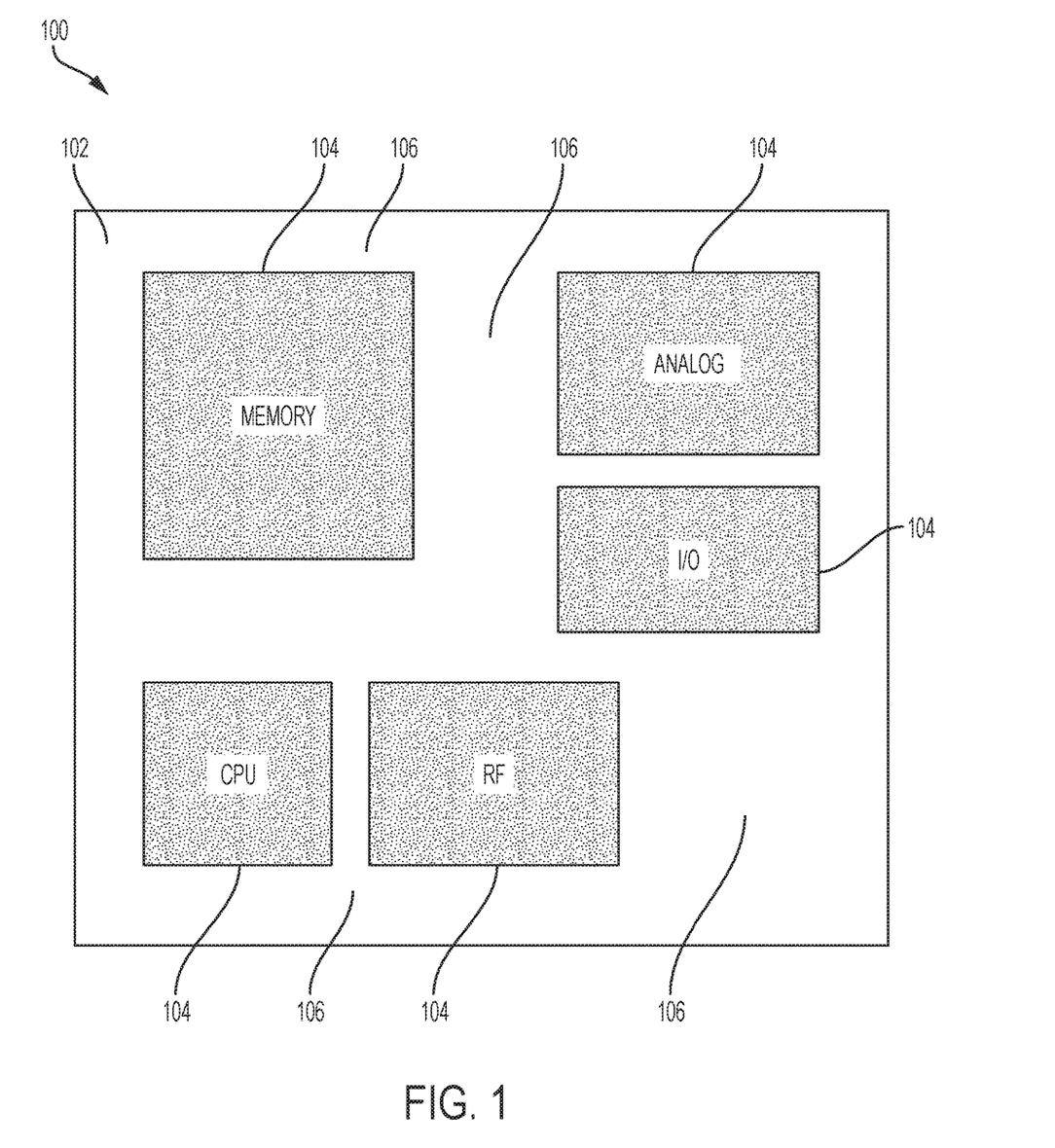
FIG. 1 depicts a top-down view of an IC substrate showing functional elements of the IC and remaining white space according to one or more embodiments of the present invention.

Turning now to a more detailed description of embodiments of the present invention, FIG. 1 depicts a top-down view of an IC device 100 according to embodiments of the invention. The IC device 100 includes a substrate 102 containing functional elements 104, along with one or more remaining white spaces 106. The substrate 102 can be composed of a semiconductor material such as silicon (Si), for example, and can support various functional elements 104 that define an integrated circuit (IC). The functional elements 104 supported by the substrate 102 include, but are not limited to, memory, an analog logic block, input/output (I/O) logic, a central processing unit (CPU), and a radio frequency (RF) section. The functional elements 104 are shown for illustrative purposes only to show the use of substrate 102 surface area and are not necessarily representative of any actual IC or other circuit design.

In the IC layout and design field it is uncommon for the functional elements 104 to consume all of the available space on a substrate. This is due to limitations of the design software, relative sizes of the functional elements, and the limitations of placing logic devices in close proximity to one another. IC designers typically occupy portions of the white space 106 with corporate logos and non-functional logic gates (e.g. "dummy fill"). In some embodiments of the present invention, portions of the white space 106 are occupied by security circuits in an effort to make reverse engineering attempts more difficult, as described in further detail herein. Security circuits are used to record and store a key code. In some embodiments, the key code is a binary word that has been assigned to a particular IC or to a batch of ICs. The key code is made of binary "1"s and "0"s and can contain data from 1 to 256 bits in length or greater. Due to the small size of the key code as compared to the functional elements 104 that can contain millions of gates, a security circuit is physically small (i.e., a security circuit can have a footprint that is much smaller than the footprint of the functional elements 104).

Figure 2:
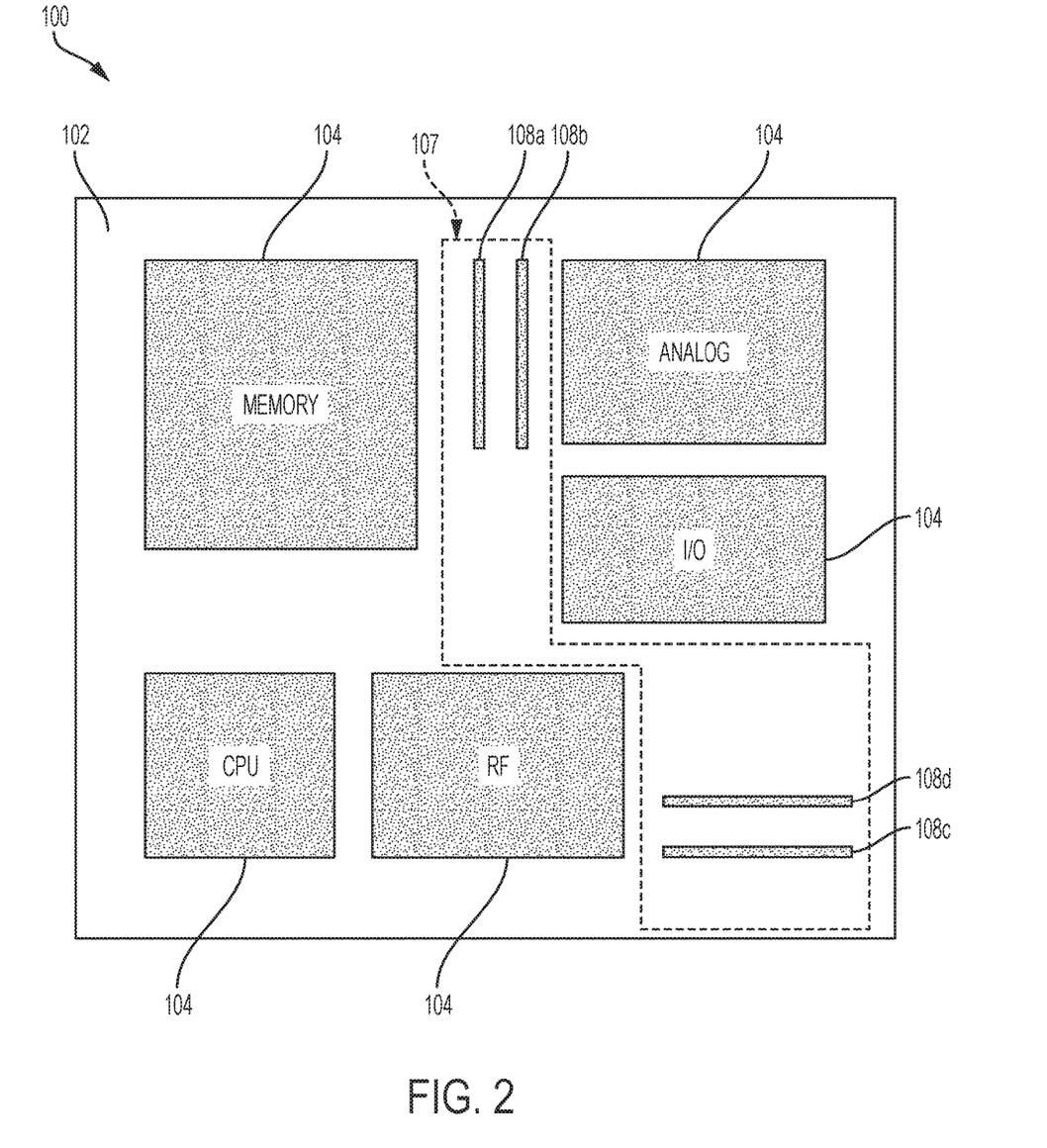
FIG. 2 depicts a top-down view of an IC substrate with a single security circuit segmented into multiple parts according to one or more embodiments of the present invention.

FIG. 2 depicts a top-down view of an IC device 100 with a single security circuit 107 segmented into multiple security parts 108a, 108b, 108c, and 108d (i.e., multiple segments 108a, 108b, 108c and 108d) according to one or more embodiments of the present invention. FIG. 2 is a continuation of FIG. 1. The security circuit 107 can comprise at least 100 individual circuits. The security parts 108a, 108b, 108c, and 108d can be formed as a memory element configured to store a security key code, or data representing portions of a security key code. For example, the security parts 108a, 108b, 108c, and 108d can either be a reprogrammable or non-erasable (permanent) memory device. Each security part 108a, 108b, 108c and 108d can be electrically coupled to one another as needed to create a functioning security circuit 107. In some embodiments of the present invention, an integrated circuit operating system can read the data (e.g., bits) stored by the security parts 108a, 108b, 108c and 108d. The integrated circuit operating system can include, for example, the functional elements 104 (e.g., the CPU, memory, etc.) which can operate together with a security circuit 107 to program and/or read data (e.g., the security key code) from the security parts 108a, 108b, 108c and 108d. In another example, a peripheral circuit (not shown) can be included that programs and/or reads data to and from the security parts 108a, 108b, 108c and 108d. The peripheral circuit typically includes a column selector and a row selector, along with other circuits, to determine which bit to program or read from a given security part 108a, 108b, 108c and 108d.

As described above, conventional security circuits have a single security circuit placed in a single area on a substrate 102. These conventional single security circuits formed as a single part are easily discoverable by inspection, measurement, testing, or other methods performed according to reverse engineering techniques. One or more embodiments of the invention, however, provide an IC device 100 that includes a security circuit 107 which has been segmented into a plurality of separate and independent security parts 108a, 108b, 108c, and 108d, as described herein. Although four separate security parts 108a, 108b, 108c, and 108d are illustrated, the invention is not limited thereto. It is understood that the security circuit 107 can include any number of security parts.

Still referring to FIG. 2, each security part 108a, 108b, 108c and 108d is formed in different areas of the white space 106 (previously shown in FIG. 1). In a non-limiting embodiment, a security circuit 107 can be segmented into as little as two security parts or into dozens or more security parts. The individual security parts themselves have physically small dimensions. For example, an individual security part 108a, 108b, 108c and 108d can have a dimension of approximately 100 square microns in area, or smaller, while the typical functional elements 104 can have a dimension of approximately 1 square millimeter in area, or larger, and the entire IC device 100 can have a dimension of approximately 1 square centimeter in area, or larger. Accordingly, an individual security part 108a, 108b, 108c and 108d is approximately 10,000 times smaller than a typical functional element 104 and 1,000,000 times smaller than a typical IC device 100. The white space 106 constitutes approximately 10-20% of IC device 100 with approximately 5-25% of it usable for placing individual security parts 108a, 108b, 108c and 108d. About 10,000 individual security parts 108a, 108b, 108c and 108d can be placed onto an IC device 100 without increasing its area or manufacturing cost. The security circuit 107 shown in FIG. 2 is for illustrative purposes only and does not represent the actual sizes of any particular security circuit design, layout, or individual part.

Returning to the description of security circuit 107, segmenting the security circuit 107 into individual and separately located security parts 108a, 108b, 108c and 108d hinders reverse engineering efforts performed by unauthorized users. For instance, the segmented security circuit 107 forces unauthorized users to look in several different areas of the substrate 102 in an attempt to identify the individual parts or segments 108a, 108b, 108c and 108d that form a complete security circuit 107. Furthermore, discovery avoidance can be enhanced by locating individual security circuit parts 108a, 108b, 108c and 108d very near other functional elements 104.

Figure 3:
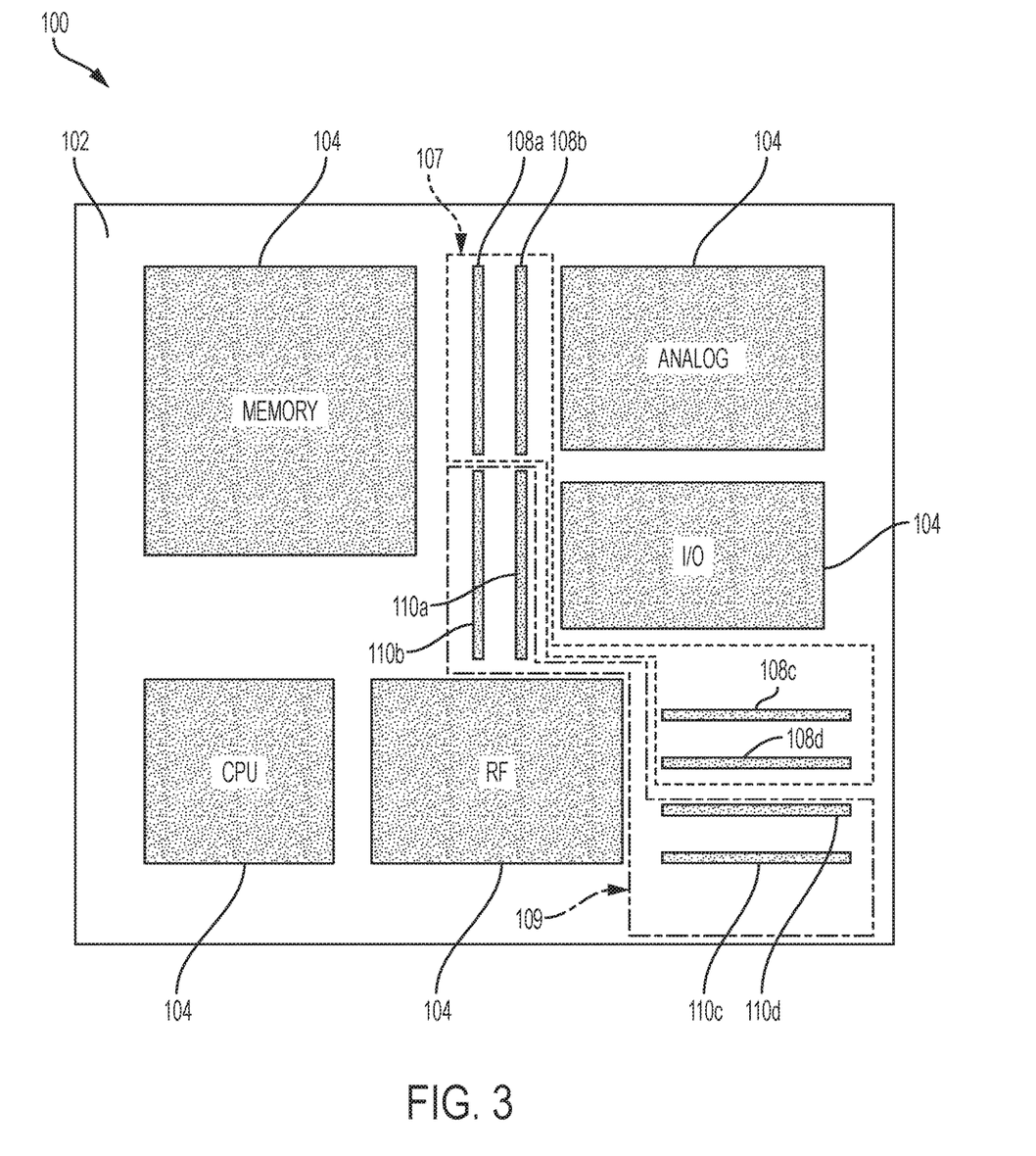
FIG. 3 depicts a top-down view of an IC substrate with multiple security circuits segmented into multiple parts according to one or more embodiments of the present invention.

FIG. 3 depicts a top-down view of an IC substrate 100 with two different security circuits 107 and 109. Each security circuit 107 and 109 is segmented into multiple security parts according to one or more non-limiting embodiments of the present invention. Although two segmented security circuits 107 and 109 are shown, the invention is not limited thereto. For instance, three or more different segmented security circuits can be formed on the substrate 102.

A first security circuit 107 is operational (i.e. valid) while a second security circuit 109 is non-operational (i.e., invalid). The non-operational circuit 109, however, includes individual security parts 110a, 110b, 110c, and 110d that appear identical or nearly identical to the individual security parts 108a, 108b, 108c, and 108d of the operational security circuit 107. In this manner, the non-operational circuit acts as a dummy circuit or decoy circuit which further aims to hinder unauthorized users from identifying the individual parts or segments 108a, 108b, 108c and 108d that form the complete security circuit 107. That is, forming multiple security circuits 107 and 109 onto the substrate 102 further hinders reverse engineering efforts by making it more difficult for an unauthorized user to determine which security circuit (i.e., 107 or 109) is an authentic circuit and which is a dummy circuit. Moreover, by mixing the individual security parts 110a, 110b, 110c, and 110d of the non-operational circuit 109 among the operational security parts 108a, 108b, 108c, and 108d, it can be difficult to determine which security circuit (i.e., 107 or 109) a given security part belongs to. In at least some embodiments, the security parts 108a-108d and 110a-110d (which can be formed as individual memory elements as described above) are programmed with either authentic key code data or false key code data as appropriate.

In one or more non-limiting embodiments, the IC device 100 accesses only portions of a valid key code from any one or more of the security parts 108a-108d and 110a-110d. In some embodiments, a dummy security circuit (e.g., 109) including one or more unused segmented parts (e.g., 110a-110d) is programmed with a false key code. In a non-limiting embodiment, an integrated circuit operating system can read the valid key code data from security parts 108a-108d of the operational security circuit 107 and also false key code data from unused security parts 110a-110d of the dummy security circuit 109. In this manner, unused security parts 110a-110d containing false key code data appear to operate as valid security parts 108a-108d containing the valid key code data, thereby confusing unauthenticated users and further hindering reverse engineering efforts.

In yet other embodiments, the key code can be itself segmented and programmed into multiple memory elements which are separately located according to the placement of a corresponding security part 108a-108d and 110a-110d. In one example, the first 128 bits of a 256 bit valid key code are read from a first security circuit memory element (e.g., a first security part 108a) of a first security element 107, while the second 128 bits of the 256 bit valid key code are read from a second security circuit memory element (e.g., a second security part 108d) of the first security circuit 107. The first and second security circuits can comprises 100 or individual circuits, for example. As illustrated in FIG. 3, a first security circuit memory element 108a is located away from a second security memory element 108d at a different area of the substrate 102. In addition, the first and second security parts 108a and 108d are commingled with unused security elements 110a-110d. Accordingly, only the designer of the IC device 100 knows which security circuit memory elements are valid (e.g., 108a and 108d) and which are dummy elements (e.g., 110a-110d).

Availably of the white space 106 for 10,000 or more individual security elements allows for scaling up the number of segmented security circuits 107, 109 to about 1,000 as well as increasing the number of segments within each security circuit. A large number of spatially distributed security circuits further improve the strength of the authentication system.

Figure 4:
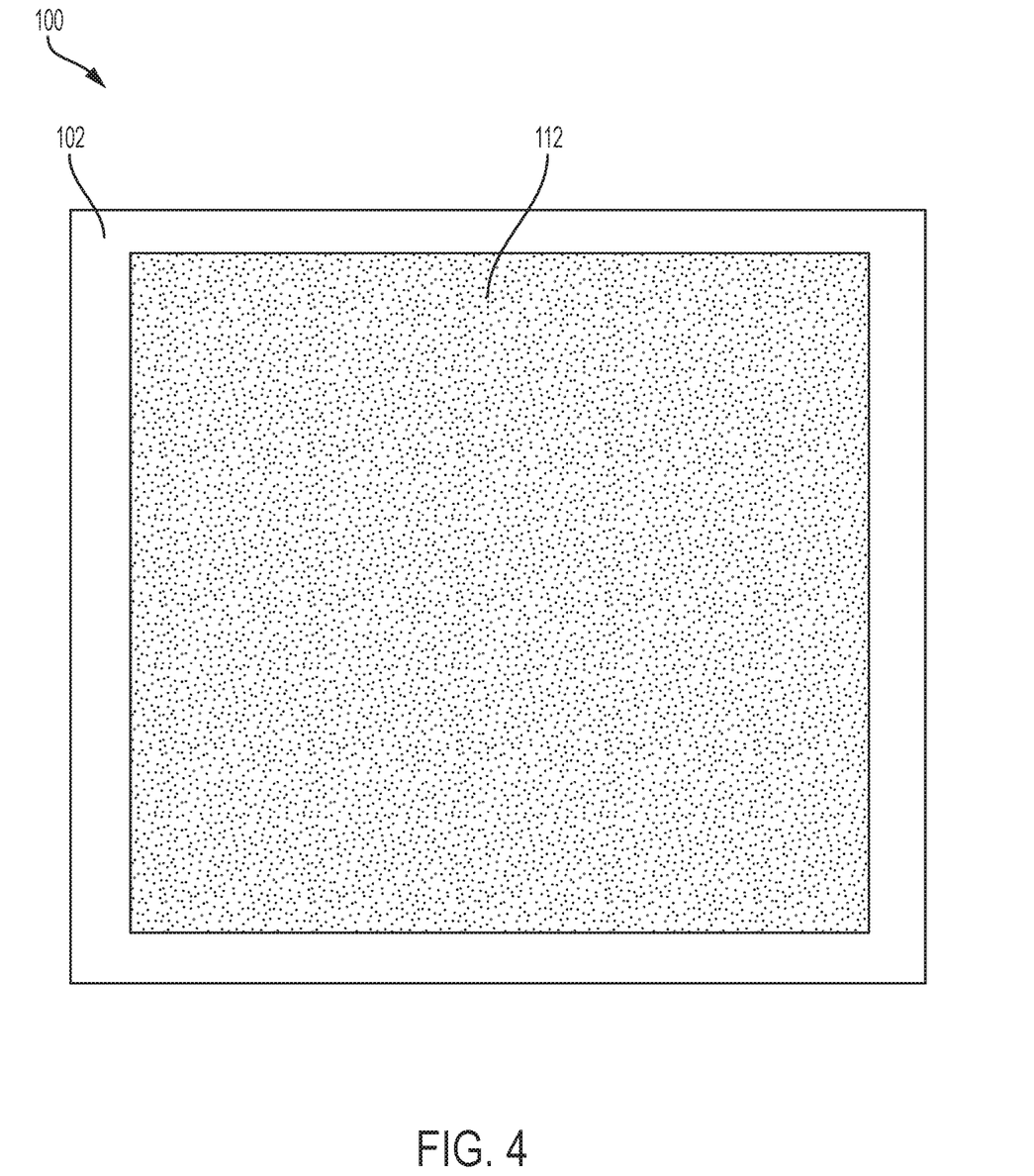
FIG. 4 depicts a top-down view of an IC substrate with an opaque layer deposited on top of the IC according to one or more embodiments of the present invention.

FIG. 4 depicts a top-down view of an IC substrate 100 with an opaque layer 112 deposited on top of the IC device 100 according to one or more embodiments of the present invention. In some embodiments, one or more security circuits, (e.g., 107 and/or 109 shown in FIGS. 2 and 3) can be analyzed by using visual inspection, e-beam, infrared inspection, or by using penetrating light sources to view the state of individual gates or devices. In an effort to deter unauthorized users from visually viewing the state of gates or devices including e-fuses, an opaque layer 112 is deposited on top of the substrate 102. The opaque layer 112 can be made of any material that inhibits penetrating energy waves such as, for example, light. Materials for the opaque layer 112 can include lead or other materials that inhibit energy from passing through and reaching the underlying substrate 102. For instance, the optical layer 112 can be composed of materials capable of absorbing inspection sources such as light or other inspection energies so that information of the underlying device layer is concealed. The optical layer 112 can also be composed of materials capable of completely reflecting inspection sources (e.g., light or other inspection energies) away from the IC 100 so that information of the underlying device layer is concealed.

As described herein, one or more embodiments include fabrication methods and resulting semiconductor devices (e.g., an IC) that contain one or more security circuits that have been segmented into multiple pieces. The individual security segments are located in multiple white space areas designated on a substrate, which also includes functional elements of the IC. In some embodiments, the IC can include several dummy or decoy security circuits which are segmented and located on the substrate, along with a valid security circuit to further inhibit an unauthorized user from determining the key code by visual inspection, measurement, test, or other forms of reverse engineering. Some embodiments also an IC substrate with an opaque layer deposited on top of the IC device. The opaque layer can be made of any material that inhibits penetrating energy waves such as light, for example, to deter unauthorized users from visually viewing the state of the underlying gates or devices.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The phrase "selective to," such as, for example, "a first element selective to a second element," means that the first element can be etched and the second element can act as an etch stop. A selective etching process can also refer to etching process that employs an etchant that attacks a first material more aggressively than a second material. In this manner, the first material can be removed while maintaining the second material.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of fabricating an authentic integrated circuit, the method comprising:
   forming an integrated circuit on a substrate;
   placing a plurality of individual security parts on a white space of the substrate that excludes the integrated circuit, the plurality of individual security parts defining at least one security circuit, each security part being completely separated from one another and dispersed at a different white space locations of the substrate so as to separate the security circuit into segments; and
   programming at least one security part among the plurality of individual security parts with key code data so as to program the at least one security circuit with a key code,
   wherein the individual security parts include e-fuses.

2. The method of claim 1 further comprising:
   forming multiple security circuits on the integrated circuit;
   designating at least one of the multiple security circuits as a valid security circuit, while designating remaining multiple security circuits as unused security circuits; and
   programming the at least one valid security circuit with a valid key code, while excluding the valid key code from the unused security circuits.

3. The method of claim 2, wherein a false key code different from the valid key code is programmed into at least one of the unused security circuits to hinder reverse engineering efforts.

4. The method of claim 3 further comprising reading the false key code from the at least one unused security circuit to hinder reverse engineering by unauthenticated users.

5. The method of claim 2, wherein the valid key code is segmented in parts and programmed into multiple security circuits to hinder reverse engineering efforts.

6. The method of claim 1, wherein the plurality of individual security parts are non-erasable memory elements.

7. The method of claim 1, wherein the plurality of individual security parts are reprogrammable memory elements.

8. The method of claim 1, wherein a plurality of integrated circuits are co-located on a silicon wafer, and wherein each integrated circuit has at least one corresponding security circuit, and wherein each security circuit is programmed with the same key code.

9. The method of claim 1, wherein a plurality of integrated circuits are co-located on a silicon wafer, the plurality of integrated circuits including a first integrated circuit having a first security circuit and a second integrated circuit having a second security circuit, wherein the first security circuit is programmed with a first key code and the second security circuit is programmed with a second key code different from the first key code.

10. The method of claim 1, wherein a plurality of integrated circuits are co-located on a silicon wafer, and wherein each integrated circuit has at least one corresponding security circuit, and wherein some security circuits are programmed with the same key code and the remainder of the security circuits are programmed with a unique key code.

11. The method of claim 1 further comprising covering the at least one security circuit with an opaque layer to prevent accessing the plurality of individual security parts using penetrating light.

12. A device including an authenticate integrated circuit, the device comprising:
an integrated circuit on a substrate;
at least one security circuit segmented into at least two completely separated security parts,
wherein the at least two security parts are located at different white space locations on the substrate such that the at least one security circuit extends from a first white space location of the substrate to a second white space location located remotely from the first white space location, the white space locations excluding the integrated circuit, and
wherein at least one of the security parts includes an e-fuse having a key code programmed therein that authenticates the integrated circuit.

13. The device of claim 12 further comprising multiple security circuits located on the integrated circuit, wherein the multiple security circuits include at least one operational security circuit that stores a valid key code and at least one non-operational security circuit that excludes the valid key code.

14. The device of claim 13, wherein a false key code is programmed into the at least one security circuit.

15. The device of claim 13, wherein the multiple security circuits comprise at least 100 circuits.

16. The device of claim 12, wherein the e-fuses are non-erasable memory elements.

17. The device of claim 12, wherein the e-fuses are reprogrammable memory elements.

18. The device of claim 12, wherein the security circuit is covered with an opaque layer comprising a material configured to at least one of block or reflect energy from penetrating therethrough.

* * * * *